(12) United States Patent
Zhao et al.

(10) Patent No.: US 12,729,802 B2
(45) Date of Patent: Sep. 8, 2026

(54) ADJUSTMENT HOOK ASSEMBLY AND METHOD OF FIXING AUDIOVISUAL DEVICE TO AUDIOVISUAL STAND

(71) Applicant: Ningbo Aoshijia Trade Co., Ltd., Ningbo (CN)

(72) Inventors: Xuming Zhao, Ningbo (CN); Weidong Chen, Ningbo (CN)

(73) Assignee: Ningbo Aoshijia Trade Co., Ltd., Ningbo (CN)

( * ) Notice: Subject to any disclaimer, the term of this patent is extended or adjusted under 35 U.S.C. 154(b) by 53 days.

(21) Appl. No.: 19/007,425

(22) Filed: Dec. 31, 2024

(65) Prior Publication Data

US 2025/0129880 A1 Apr. 24, 2025

(51) Int. Cl.
*F16M 11/08* (2006.01)
*F16M 11/10* (2006.01)
*F16M 13/02* (2006.01)

(52) U.S. Cl.
CPC ............ *F16M 11/10* (2013.01); *F16M 13/02* (2013.01)

(58) Field of Classification Search
CPC ............................... F16M 11/10; F16M 13/02
See application file for complete search history.

(56) References Cited

U.S. PATENT DOCUMENTS 8,690,111 B2 * 4/2014 Huang .................. F16M 11/10 248/371
11,473,722 B2 * 10/2022 Amidei .................. F16M 11/08
11,608,936 B2 * 3/2023 Fehr ..................... F16M 11/041
11,965,542 B2 * 4/2024 Van Kuijk ............. F16M 13/02
2007/0262215 A1 11/2007 Tan
2009/0084918 A1 4/2009 Pfister et al.
2014/0346297 A1 11/2014 Pei

* cited by examiner

*Primary Examiner* — Amy J. Sterling

(57) ABSTRACT

The invention discloses an adjustment hook assembly and a method of fixing an audiovisual device to an audiovisual stand, where a hook and a connector are respectively connected with a hanging arm of the audiovisual stand, a support arm is fixedly connected with the audiovisual device, the connector is pivotally connected with the support arm by a first fastener, the support arm is rotated to a predetermined position by relative rotation between the support arm and the connector to adjust a pitch of the audiovisual device to a desired angle, and a support member abuts against the support arm to avoid pivoting reset, which has the advantages of convenient adjustment and simplified structure.

20 Claims, 3 Drawing Sheets

ADJUSTMENT HOOK ASSEMBLY AND METHOD OF FIXING AUDIOVISUAL DEVICE TO AUDIOVISUAL STAND

TECHNICAL FIELD

The present invention relates to the technical field of audiovisual devices, and specifically relates to an adjustment hook assembly for fixing an audiovisual device to an audiovisual stand, and a method of fixing an audiovisual device to an audiovisual stand.

BACKGROUND

An audiovisual stand is a common tool for mounting an audiovisual device (e.g., a TV). A common audiovisual stand (e.g., a TV stand) has a hanging arm and a hanging plate. By mounting the hanging plate on a wall panel or a base, the audiovisual device is butted and fixed with the hanging arm. A common structure of the hanging arm, for example, includes a support arm. Two groups of hooks are mounted at intervals in a length direction of the support arm. Upper and lower hooks hook and connect an upper rod body (i.e., an upper hanging arm) of the hanging plate. The audiovisual device such as a TV is fixed by the support arm. Under the structure, a tilting angle (i.e., upper and lower pitching and tilting) of the TV is often not adjustable. Some products can adjust the pitch angle of the TV by connecting a hanger with other rotating apparatus, but the structure is complex and occupies a large volume, and needs improvement.

SUMMARY

In order to solve at least one of the above technical defects, the present invention provides the following technical solution.

As a first aspect of the present invention, there is provided an adjustment hook assembly, including:

- a support arm for the audiovisual device (e.g., TV) to be fixedly connected;
- a hook for being hung on an upper hanging arm of the audiovisual support (e.g., TV stand) and movably provided along a length direction of the support arm;
- a connector pivotally connected to the support arm by a first fastener at a first end of the connector;
- a support member movably provided on the connector and having a front end abutting against the support arm, and
- a fixture connected to the second end of the connector for fixedly connecting the lower hanging arm of the audiovisual stand with the connector.

Here, the hook and the connector are arranged at an interval from top to bottom on a back face of the support arm, the connector is further provided with a first connecting hole extending substantially along a thickness direction of the connector, and the first fastener is arranged along a width direction of the support arm and is penetratingly arranged in the first connecting hole.

The connector is rotated around the first fastener as an axis, so that a spacing between the second end of the connector and the support arm changes to change a pivoting angle of the connector, and the support member abuts against the support arm to keep the connector in position.

The present invention redesigns the structure of the hook assembly, and when in use, if the hook and the pivotal connection portion of the connector are butted with the audiovisual stand, the support arm is butted with the audiovisual device, the connector is pivotally connected with the support arm by a rotating shaft and pivotally connected with the audiovisual stand by the pivotal connection portion, the support arm can be rotated relative to the connector to a predetermined position, the audiovisual device butted with the support arm is pitched to a desired angle, and then the support member is operated to abut against the support arm to avoid resetting the support arm, and the support arm is kept in a position relative to the connector.

As a second aspect of the present invention, there is also provided a method of fixing an audiovisual device to an audiovisual stand, including:

- providing an adjustment hook assembly having at least a portion of the structure described above;
- fixing the audiovisual device to a support arm of the adjustment hook assembly before or after connecting the adjustment hook assembly to the audiovisual stand; and
- hanging a hook of the adjustment hook assembly to an upper hanging arm of the audiovisual stand, fitting a lower hanging arm of the audiovisual stand at a connector and fixedly connecting the lower hanging arm with the connector by a fixture.

Here, a protrusion length of the support member is adjusted in advance before mounting or after the fixing is completed, and the adjustment is achieved by changing the protrusion length of a front end of the support member.

Compared with the prior art, the present invention has the following beneficial effects.

For the adjustment hook assembly according to the present invention, with the cooperation of the connector, the support arm and the support member, the support arm can be pivoted to a desired position (i.e., to a desired angle) relative to the connector; and after the TV or another audiovisual device is fixed to the support arm, the TV or the support arm can be pitched and rotated to adjust pitch and tilt angles of the TV, which has the advantages of simplified structure and convenient use.

BRIEF DESCRIPTION OF THE DRAWINGS

In order to illustrate the technical solutions in the embodiments of the present invention more clearly, the accompanying drawings required for the description of the embodiments will be briefly introduced below.

Figure 1:
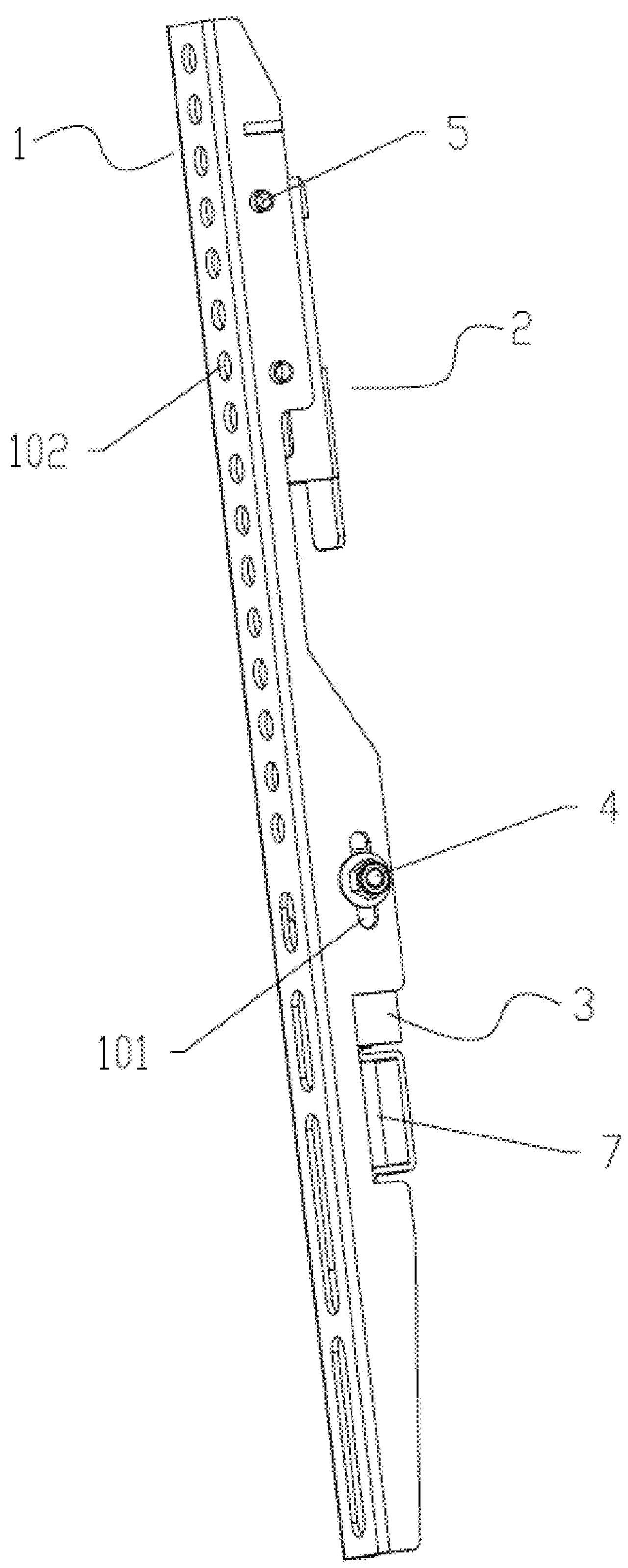
FIG. 1 is a structural schematic diagram of an adjustment hook assembly according to Embodiment 1.

Reference numerals in the drawings are as follows: 1. support arm; 2. hook; 3. connector; 4. first fastener; 5. second fastener; 6. limiting member; 7. pivotal connection portion; 8. support member; 9. fixture; 21. hook arm; 22. hook body; 23. waist hole; 31. first connecting hole; 100. groove; 101. second connecting hole; 102. mounting hole; 103. convex plate; 104. notch; 111. connecting plate; 112. first wall member; and 113. second wall member.

DESCRIPTION OF THE EMBODIMENTS

The present invention will be further described below with reference to the accompanying drawings and specific embodiments.

Embodiment 1

As shown in FIG. 1, the adjustment hook assembly in the present embodiment includes a support arm 1, a hook 2 and a connector 3. In the present embodiment, the support arm 1 is of a slat structure; the support arm 1 has a connecting plate 111 and a first wall member 112 and a second wall member 113 which are provided in a bent manner toward the same side on both sides of the connecting plate 111; the connecting plate 111, the first wall member 112 and the second wall member 113 are integral members and are manufactured by bending forming; a groove 100 is formed by the connecting plate 111, the first wall member 112 and the second wall member 113 through enclosing; the hook 2 and the connector 3 are arranged at an interval from top to bottom on a back face of the support arm 1; and the hook 2 and the connector 3 are used to butt a upper hanging arm and a lower hanging arm of an audiovisual stand, thus fixing the adjustment hook assembly to the audiovisual stand.

The audiovisual stand (TV stand) is not shown in the figure, and the structure of the audiovisual stand is known in the prior art, such as the specific structure disclosed in Chinese patents No. CN207112257U, CN212005018U or CN212005017U, where the upper hanging arm and the lower hanging arm may be two independent components, or may be an upper cross arm and a lower cross arm of an integral component.

In the present embodiment, in order to facilitate adjustment of pitch and tilt angles of an audiovisual device (not shown in the figure) such as a TV, the improvement is as follows: a first end portion of the connector 3 is pivotably connected to the back face of the support arm 1 by a rotating shaft, and the connection is provided with a groove for movement of the rotation shaft in a thickness direction of the support arm 1, so that the support arm 1 is rotatable along the thickness direction of the support arm 1 relative to the connector 3, so that a distance between a second end portion of the connector 3 and the back face of the support arm 1 is variable.

Figure 2:
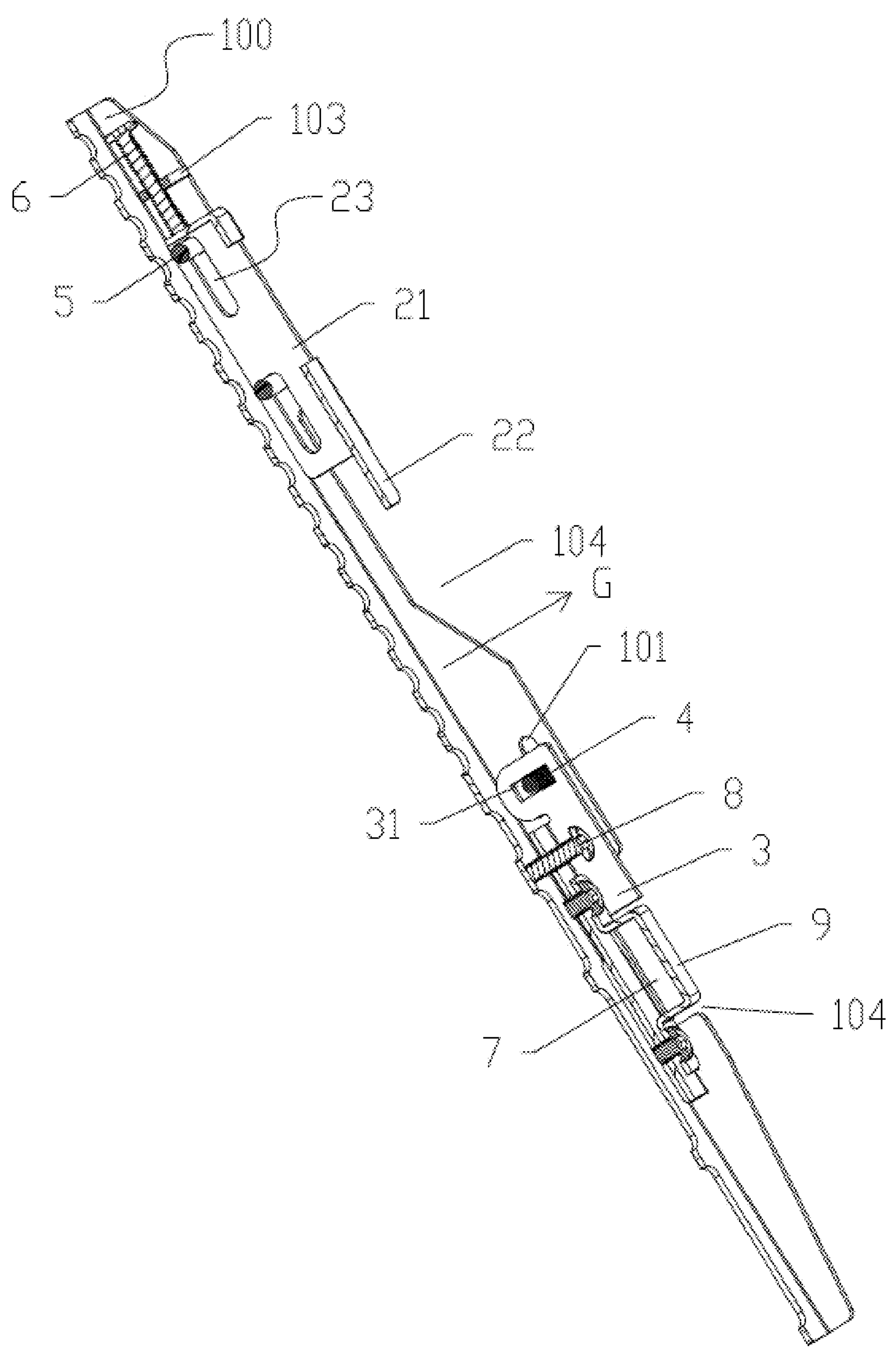
FIG. 2 is a cross-sectional structural schematic diagram of the adjustment hook assembly.

As specifically shown in FIGS. 1 and 2, a first connecting hole 31 extending and formed along a thickness direction of the connector 3 is provided at the first end portion of the connector 3; where extending in the thickness direction of the connector 3 means that in the state shown in FIG. 1, a length direction of the first connecting hole 31 is parallel to the thickness direction of the connector 3, or is substantially parallel and at a predetermined small included angle (i.e., parallel or nearly parallel) to the thickness direction of the connector, for example, the included angle is 5°, 10° or other desired value, and an appropriate angle value can be freely selected according to requirements; and an end portion of the rotating shaft extends into the first connecting hole 31, the first connecting hole 31 serves as a groove for the rotating shaft to move, and the rotating shaft slides along the first connecting hole 31 and rotates relative to the first connecting hole 31.

Figure 3:
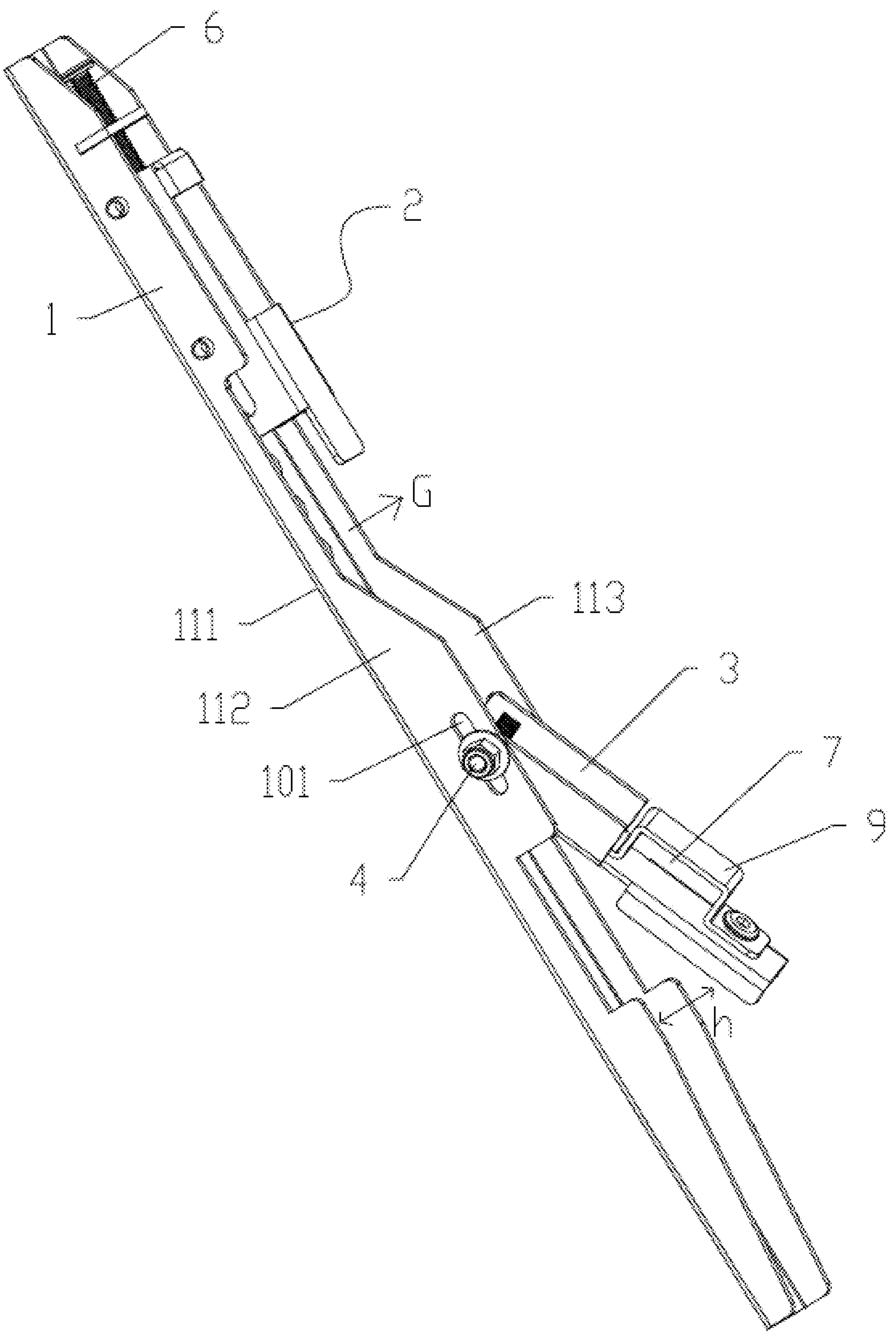
FIG. 3 is a structural schematic diagram after a support arm and a connector are rotated relative to each other.

As shown in FIG. 3, when the support arm 1 is rotated relative to the connector 3, the rotating shaft can move and rotate in the first connecting hole 31, and the distance h between the second end portion of the connector 3 and the back face of the support arm 1 changes along the thickness direction G of the support arm 1, so that the audiovisual device fixed to the support arm 1 is adjusted in pitch and tilt angles.

For the rotating shaft, a bolt-type fastener may be used as the rotating shaft, or a stud may be mounted on one of the connector 3 and the support arm 1, and a hole may be formed at a corresponding position on the other, and the stud may extend into the hole to form pivotal butt joint. As shown in FIGS. 1 and 2, in the present embodiment, a bolt is used as the first fastener 4, and the first fastener 4 is used as the rotating shaft, and an end portion of the first fastener 4 passes from the support arm 1 and extends into the first connecting hole 31 located at the first end portion of the connector 3, so that the connector 3 and the support arm 1 form a pivotal connection by the first fastener 4.

Since the connector 3 is used to butt the audiovisual stand, during rotation of the support arm 1, the connector 3 also needs to rotate relative to the audiovisual stand. Therefore, in the present embodiment, a pivotal connection portion 7 is provided on the connector 3, so that the pivotal connection portion 7 is pivotally connected with the audiovisual stand.

As shown in FIGS. 2 and 3, a hole-type pivotal connection portion is provided at the second end portion below the pivoting position of the rotating shaft of the connector 3 to serve as the pivotal connection portion 7, and the lower hanging arm of the audiovisual stand is penetratingly arranged in the hole-type pivotal connection portion.

Of course, in other embodiments, it is also possible to select a stud as the pivotal connection portion 7 according to requirements, and the pivot connection with the hole arranged in the audiovisual stand is achieved by the stud.

In order to facilitate butting, in the present embodiment, a fixture 9 is mounted on the connector 3, the fixture 9 is mounted at a predetermined position of the connector 3, and both of them cooperate to form a third connecting hole, and the third connecting hole serves as the pivotal connection portion 7. For example, the fixture 9 is in the shape of an arch bridge and is fixed with the connector 3 at both ends of the fixture 9 by threaded fasteners, a space enclosed between the fixture 9 and the connector 3 is formed as the third connecting hole, and the threaded fastener may be a bolt.

When butted with the audiovisual stand, the fixture 9 can be separated from the connector 3 first, and after the support arm 1 is pivoted to a predetermined position, the fixture 9 is sleeved on the lower hanging arm of the audiovisual stand, and the fixture 9 is fixedly connected with the connector 3.

During use, the support arm 1 is generally longitudinally arranged, and is butted with the transversely extending lower hanging arm of the audiovisual stand by the pivotal connection portion 7 of the connector 3, and an orifice of the third connecting hole is oriented in a width direction of the support arm 1. Here, extending along the width direction of the support arm 1 means that as shown in FIG. 2, a length direction of the third connecting hole is parallel or at a small predetermined included angle (the included angle is freely selected according to requirements) to the width direction of the support arm 1. That is, the length direction of the third connecting hole is parallel to or nearly parallel to the width direction of the support arm 1.

Furthermore, in view of the fact that the lower hanging arms of different audiovisual stands for butting with the pivotal connection portion 7 may have different heights, as shown in FIGS. 1 and 2, a second connecting hole 101 is formed at the support arm 1 on both sides of the first connecting hole 31 at the first end portion of the connector 3 and extends along a length direction of the support arm 1, and reference is made to the above description for explanation of extending along the length direction of the support arm 1.

A bolt end portion of the first fastener 4 passes through the second connecting hole 101 and the first connecting hole 31 and is fixed by a nut; the first fastener 4 is used as a rotating shaft; after the nut is unscrewed, the position of the connector 3 can be adjusted along the length direction of the support arm 1 to adapt to the lower hanging arms of different heights on the audiovisual stand; and then the nut is tightened to fix the connector 3 to the support arm 1.

After the support arm 1 is rotated to a predetermined position relative to the connector 3, if it is required to stay at the position, a support member 8 is provided on the connector 3, the support member 8 is telescopically connected with the connector 3, and after the connector 3 is rotated to the predetermined position, a front end of the support member 8 is moved to abut against the back face of the support arm 1 and is kept at the position.

The telescopic connection of the support member 8 to the connector 3 is preferably a threaded connection.

As shown in FIG. 2, a threaded hole is formed between the rotating shaft and the fixture 9 on the connector 3, a bolt is used as the support member 8, and the support member 8 is threadedly connected at the threaded hole.

As shown in FIG. 3, the first end portion of the connector 3 is spaced apart from the back face of the support arm 1 by a predetermined distance in the thickness direction of the support arm 1, and the support member 8 is screwed to cause the front end of the support member 8 to protrude outward relative to the connector 3 by a predetermined distance, the front end of the support member 8 abuts against the back face of the support arm 1 to form a support, and the support arm 1 is kept at this position relative to the connector 3.

For the connection of the hook 2, the configuration and mounting and fixing of the hook 2 can be freely selected with reference to the commercially available technology.

To facilitate the adjustment of the position of the hook, the improvement is as follows: the hook 2 includes a hook arm 21 and a hook body 22 connected with a lower end portion of the hook arm 21; the hook 2 is slidably connected with the support arm 1 along the length direction of the support arm 1. For the specific slidable connection structure, as shown in FIGS. 1 and 2, a waist hole 23 is formed on the hook arm 21, and the waist hole 23 extends along the length direction of the support arm 1; and a second fastener 5 is transversely mounted on the support arm 1 at both sides of the hook arm 21; the second fastener 5 may be a bolt, and the bolt as the second fastener 5 extends into the waist hole 23, so that the hook 2 and the support arm 1 form a sliding connection, thus sliding adjustment can be performed according to the position of the lower hanging arm on the audiovisual stand.

In order to facilitate the fixing of the position of the hook 2, a limiting member 6 is telescopically connected on the back face of the support arm 1 above an upper end portion of the hook arm 21 along the length direction of the support arm 1, and telescoping along the length direction of the support arm 1 means that: a telescoping direction of the limiting member 6 is parallel to or at a small predetermined included angle to the length direction of the support arm 1 (i.e., the telescoping direction of the limiting member 6 is parallel to or nearly parallel to the length direction of the support arm 1); the limiting member 6 is preferably a bolt; the limiting member 6 is threadedly connected to the back face of the support arm 1, such as a protrusion portion on the back face of the support arm 1; a front end of the limiting member 6 is abutted against the hook arm 21; and the limiting member 6 is screwed to correspondingly adjust upper and lower positions of the hook 2 when butted with the audiovisual stand.

It is of course also possible for the sliding connection to take the form of a common slider or sliding chute, which can be selected according to requirements.

In order to facilitate assembly and butting, a groove 100 is formed on the back face of the support arm 1 along the length direction of the support arm 1, the connector 3 and the hook 2 are both connected in a groove cavity of the groove 100, a bolt as the second fastener 5 is extended into the waist hole 23, and the second connecting hole 101 is formed at a groove wall.

In order to facilitate the butting of the hook 2 and the pivotal connection portion 7 with the lower hanging arm of the audiovisual stand, notches 104 are formed at the groove walls on both sides of the support arm 1, and the hook body 22 is movably arranged toward the notches 104.

A convex plate 103 as the protrusion portion may be integrally formed at a bottom wall of the groove 100, or the convex plate 103 may be transversely fixed at the groove 100, and a threaded hole may be formed on the convex plate 103 to be threadedly connected with the limiting member 6, and the convex plate 103 may be fixed by fitting or by a screw.

In the present embodiment, a common mounting hole is used as an example to illustrate the butting of the support arm 1 with an audiovisual device such as a TV. As shown in FIG. 1, a through hole is formed on a front face of the support arm 1 as the mounting hole (i.e., mounting hole 102), and the TV is mounted in the mounting hole 102 by a fastener such as a screw.

When the TV is used after mounting, the TV is fixed to the support arm 1, the hook 2 on the back face of the support arm 1 and the pivotal connection portion 7 of the connector 3 are fixed to the upper hanging arm and the lower hanging arm of the audiovisual stand, the support arm 1 is rotated to adjust the pitch of the TV to a desired angle, and then the support member 8 is screwed to abut the front end of the support member 8 against the support arm 1 to avoid resetting the support arm 1, so that the support arm 1 is kept in position relative to the connector 3.

Of course, the support member 8 may be screwed in advance to adjust a pitch angle, and then the TV may be fixed to the audiovisual stand by the adjustment hook assembly.

A method of fixing an audiovisual device (e.g., a TV) to an audiovisual stand using the adjustment hook assembly of the present embodiment includes:

providing the adjustment hook assembly described above, having at least a partial structure as described above;

fixing the audiovisual device (e.g., TV) to be fixed to a support arm 1 before or after connecting the adjustment hook assembly to the audiovisual stand; and hanging a hook 2 to an upper hanging arm of the audiovisual stand, fitting a lower hanging arm of the audiovisual stand at a connector 3, and fixedly connecting the lower hanging arm with the connector 3 by a fixture 9.

Here, a protrusion length of a support member 8 can be adjusted in advance before mounting, or the support member 8 can be screwed and adjusted after the fixed connection is completed to adjust a pivoting angle of the connector 3 by changing a length of a front end of the support member 8 protruding from the connector 3.

Preferably, a position of the hook 2 along a length direction of the support arm 1 is adjusted in advance before mounting, so that the adjustment hook assembly can be adapted to audiovisual stands having different sizes/specifications (different distances between the upper and lower hanging arms of the audiovisual stands of different sizes/specifications).

Preferably, the limiting member 6 adjusts the position of the hook 2 along the length direction of the support arm 1 by screwing, and the support member 8 adjusts the pivoting angle between the connector 3 and the support arm 1 by screwing, thus achieving the purpose of adjusting a pitch angle of the audiovisual device after the adjustment hook assembly is mounted.

What is claimed is:

1. An adjustment hook assembly for connecting between an audiovisual device and an audiovisual stand to fix the audiovisual device to the audiovisual stand, comprising:

a support arm for the audiovisual device to be fixedly connected;

a hook for being hung on an upper hanging arm of the audiovisual stand and movably provided along a length direction of the support arm;

a connector pivotally connected to the support arm by a first fastener at a first end of the connector;

a support member movably provided on the connector and having a front end abutting against the support arm, and a fixture connected to a second end of the connector for fixedly connecting a lower hanging arm of the audiovisual stand with the connector;

wherein the hook and the connector are arranged at an interval from top to bottom on a back face of the support arm, the connector is further provided with a first connecting hole extending substantially along a thickness direction of the connector, and the first fastener is arranged along a width direction of the support arm and is penetratingly arranged in the first connecting hole; and the connector is rotated around the first fastener as an axis to change a pivoting angle of the connector by changing a spacing between the second end of the connector and the support arm, and the support member abuts against the support arm to keep the connector in position.

2. The adjustment hook assembly according to claim 1, wherein the support arm comprises a connecting plate and a first wall member and a second wall member which are provided in a bent manner toward the same side on both sides of the connecting plate, and the hook and the connector are both arranged between the first wall member and the second wall member.

3. The adjustment hook assembly according to claim 2, wherein the first wall member and the second wall member are provided with a second connecting hole extending along the length direction of the support arm, and the first fastener is penetratingly arranged in the second connecting hole and the first connecting hole.

4. The adjustment hook assembly according to claim 1, wherein the fixture is detachably connected to the connector, and a pivotal connection portion is formed between the fixture and the connector for fixing the lower hanging arm of the audiovisual stand.

5. The adjustment hook assembly according to claim 4, wherein the support member is arranged between the first fastener and the pivotal connection portion.

6. The adjustment hook assembly according to claim 4, wherein the fixture is detachably connected with the connector by a threaded fastener.

7. The adjustment hook assembly according to claim 1, wherein the support member is threadedly connected with the connector, and abuts against the support arm at the front end of the support member, and the support member is screwed to change an outward protrusion length of the front end of the support member relative to the connector to adjust the pivoting angle of the connector.

8. The adjustment hook assembly according to claim 1, wherein the hook comprises a hook arm and a hook body extending from a lower end of the hook arm, the hook body is provided with a waist hole extending along the length direction of the support arm, the support arm is fixedly provided with a second fastener, and the second fastener is penetratingly arranged in the waist hole to movably arrange the hook along the length direction of the support arm.

9. The adjustment hook assembly according to claim 8, wherein a convex plate is further provided on the support arm, a limiting member is movably provided on the convex plate and acts on the hook, and the limiting member is telescopically movable to adjust position change of the hook along the length direction of the support arm.

10. The adjustment hook assembly according to claim 9, wherein a notch is provided on the support arm, the hook is movably displaced toward the notch, and the limiting member is threadedly connected with the convex plate.

11. A method of fixing an audiovisual device to an audiovisual stand, comprising:

providing an adjustment hook assembly having the structure of claim 1;

fixing the audiovisual device to a support arm of the adjustment hook assembly before connecting the adjustment hook assembly to the audiovisual stand; and hanging a hook of the adjustment hook assembly to an upper hanging arm of the audiovisual stand, fitting a lower hanging arm of the audiovisual stand at a connector, and fixedly connecting the lower hanging arm with the connector by a fixture; and wherein a protrusion length of a support member of the adjustment hook assembly is adjusted in advance before mounting or after the fixing is completed, and the adjustment is achieved by changing the protrusion length of a front end of the support member.

12. The method according to claim 11, wherein the support member is threadedly connected with the connector, and the support member is screwed to adjust the protrusion length of the front end of the support member.

13. The method according to claim 11, wherein the hook is movably arranged along a length of the support arm for adapting to the audiovisual stand.

14. The method according to claim 11, wherein the support arm has a connecting plate and a first wall member and a second wall member on both sides of the connecting plate, and the first fastener clamps outer sides of the first wall member and the second wall member.

15. The method according to claim 14, wherein the first fastener is penetratingly arranged in a first connecting hole, and the first connecting hole extends along a thickness direction of the connector.

16. A method of fixing an audiovisual device to an audiovisual stand, comprising:

providing an adjustment hook assembly having the structure of claim 1;

fixing the audiovisual device to a support arm of the adjustment hook assembly after connecting the adjustment hook assembly to the audiovisual stand; and hanging a hook of the adjustment hook assembly to an upper hanging arm of the audiovisual stand, fitting a lower hanging arm of the audiovisual stand at a connector, and fixedly connecting the lower hanging arm with the connector by a fixture; and wherein a protrusion length of the support member is adjusted in advance before mounting or after the fixing is completed, and the adjustment is achieved by changing the protrusion length of a front end of the support member.

17. The method according to claim 16, wherein the support member is threadedly connected with the connector, and the support member is screwed to adjust the protrusion length of the front end of the support member.

18. The method according to claim 16, wherein the hook is movably arranged along a length of the support arm for adapting to the audiovisual stand.

19. The method according to claim 16, wherein the support arm has a connecting plate and a first wall member and a second wall member on both sides of the connecting plate, and the first fastener clamps outer sides of the first wall member and the second wall member.

20. The method according to claim 19, wherein the first fastener is penetratingly arranged in a first connecting hole, and the first connecting hole extends along a thickness direction of the connector.

* * * * *